United States Patent [19]
Felix et al.

[11] Patent Number: 5,954,868
[45] Date of Patent: Sep. 21, 1999

[54] METHOD AND COMPOSITION FOR ENHANCED BIOREMEDIATION OF OIL

[75] Inventors: Edward A. Felix, Cypress; Sandra L. Hruza, Houston, both of Tex.

[73] Assignee: Bionutratech, Inc., Houston, Tex.

[21] Appl. No.: 09/033,408

[22] Filed: Mar. 2, 1998

Related U.S. Application Data

[60] Division of application No. 08/471,578, Jun. 6, 1995, Pat. No. 5,725,885, and a continuation-in-part of application No. 08/051,626, Apr. 22, 1993, Pat. No. 5,443,845.

[51] Int. Cl.$^6$ .................................................. C09D 191/00
[52] U.S. Cl. ............................................ 106/243; 106/250
[58] Field of Search ................................ 106/243, 250

[56] References Cited

FOREIGN PATENT DOCUMENTS 60-5054  1/1985  Japan ..................................... 106/243

OTHER PUBLICATIONS

CA 119:122143, Ogura et al, "Powder mixtures with lubricants for pressing in powder metallurgy", Jun. 15, 1993.

Weast et al, CRC Handbook of Chemistry and Physics, "Fats and Oils"p. D–221, 1985.

*Primary Examiner*—David Brunsman
*Attorney, Agent, or Firm*—Jeffrey L. Streets

[57] ABSTRACT

A particulate material, as well as a method of manufacturing and using the material, for promoting growth of petroleum degrading bacteria to aid in bioremediation of oil spills on water and in wetlands which consists of a core of microbial available nutrients having a coating, comprised of oleic or linoleic acid and either stearic acid, palmitic acid, or a mixture thereof, which is lipophilic, and biodegradable, for retaining the nutrient in the oil for gradual release to microorganisms between applications of the material.

3 Claims, 2 Drawing Sheets

```
            ┌─────────────────────────┐
            │ MIX  MICROBIAL NUTRIENTS│
            └────────────┬────────────┘
                         ▼
            ┌─────────────────────────┐
            │   GRIND  MICROBIAL      │
            │    NUTRIENTS  INTO      │
            │      A  POWDER          │
            └────────────┬────────────┘
   TO MAKE              ▼              TO MAKE
  PELLETIZED  ┌─────────────────────┐ POWDERED
  COMPOSITE   │   FORM  AN  ALLOY   │ COMPOSITE
       ┌──────│ ENCAPSULATION COATING│──────┐
       │      └─────────────────────┘      │
       ▼                                   ▼
┌──────────────┐                  ┌──────────────┐
│  FLOW  A GAS │                  │ FLOW  A  GAS │
│UPWARD THROUGH│                  │DOWNWARD THROUGH│
│   A VESSEL   │                  │   A VESSEL   │
└──────┬───────┘                  └──────┬───────┘
       │    ┌────────────────────────┐   │
       └───▶│ AEROSOL THE MICROBIAL  │◀──┘
            │  NUTRIENT POWDER INTO  │
            │      THE VESSEL        │
            └───────────┬────────────┘
                        ▼
            ┌────────────────────────┐
            │ SPRAY THE ENCAPSULATION│
            │     COATING  AS  A     │
            │   MIST INTO THE VESSEL │
            └───────────┬────────────┘
                        ▼
            ┌────────────────────────┐
            │ ENCAPSULATION COATING  │
            │CONTACTS AND SOLIDIFIES │
            │  ON NUTRIENTS  WITH    │
            │   5-20 WT% COATING     │
            └───────────┬────────────┘
                        ▼
            ┌────────────────────────┐
            │   COLLECT  COMPOSITE   │
            │        MATERIAL        │
            └────────────────────────┘
```

*FIG. 1*

METHOD AND COMPOSITION FOR ENHANCED BIOREMEDIATION OF OIL

REFERENCE TO RELATED APPLICATIONS

This is a divisional of application Ser. No. 08/471,578 filed on Jun. 6, 1995, U.S. Pat. No. 5,725,885, and a continuation-in-part application of U.S. patent application Ser. No. 08/051,626, filed Apr. 22, 1993, U.S. Pat. No. 5,443,845.

FIELD OF THE INVENTION

This invention relates to a composition, and methods of using the composition, comprising a water soluble nutrient formulation including a source of molecular oxygen that is encapsulated in an oleophilic coating mixture which provides a slow biologically mediated release of nutrients to microorganisms which degrade oil. The invention further relates to a method of manufacturing the material and a method of using the material to achieve bioremediation of spilled oil.

BACKGROUND

Oil spills have occurred with increasing frequency as the growing demand for petroleum products has been met by increased shipments of oil in ocean going tankers, barge traffic and the like. Oil spills caused by navigational errors, especially in the presence of rough weather and other factors, can cause devastating damage to the environment.

Much of the effort to cleanup such spills has centered on mechanical methods to contain and remove the spilled oil and to clean oil contaminated areas. However, these methods are not entirely satisfactory because much of the oil either cannot be contained or escapes containment. Even when contained, mechanical removal is at best only partial. In all oil spills, small amounts to the vast majority of the spilled oil remains in the affected areas after all best efforts to clean and remove the oil are completed.

It has long been known that oil is continuously being released into the environment by natural petroleum seeps. The quantity of oil released by these natural seeps world wide annually exceeds the sum total of all worldwide petroleum hydrocarbon releases from all other sources (i.e., oil spills, tanker washings, run-off, etc.). It is also well known that these large natural releases of petroleum do not accumulate in the environment nor cause damage to the world's ecosystem. The reasons for this is that within the earth's ecosystem there is a well established, highly diverse and ubiquitously distributed population of microorganisms that degrade petroleum hydrocarbons. The application of this knowledge to utilize petroleum degrading microorganisms to treat spilled oil is known collectively as the process or method of bioremediation.

The success or effectiveness of bioremediation is dependent upon key factors being simultaneously present. First, the presence of hydrocarbon degrading microorganisms, either naturally or by addition. Second, there must be oxygen and water available to permit the microorganisms to be metabolically active. Third, there must also be available sufficient quantities of biologically utilizable nitrogen and phosphorous to enable the microbial population to rapidly metabolize the available petroleum hydrocarbons.

Microorganisms capable of degrading petroleum hydrocarbons can be found in almost all natural bodies of water. The exact type of microorganisms present in a given area of a spill may vary greatly yet each has the ability to degrade oil. The elemental nutrient requirements of petroleum degrading microbes are approximately the same as the microbes' average elemental composition. The carbon, which makes up 48 percent of the microbes composition, is obtained from the petroleum oil slick—lights to crude in weight; $C_7$ to $C_{80}$ tars. However, the remaining elemental materials necessary to grow must be provided from either the surrounding water or a supplementary source. If the supply of these other nutrients, especially nitrogen, phosphorous, sulfur, magnesium, potassium, calcium and sodium, are exhausted, then the microbe population will not grow any further. When significant quantities of petroleum have been spilled in a body of water, essential nutrients must be applied to the petroleum to sustain microbial growth.

It is usually insufficient quantities of microbially available nitrogen and phosphorous that limit the rate of natural biodegradation of spilled oil in the environment. However, the application of water soluble nitrogen and phosphorous to spills in aquatic environments has proven to be ineffective because the nutrients are rapidly dissipated into the surrounding water volume. Nutrient additive formulations have typically suffered from a number of problems including incomplete partitioning of the nutrients into the oil phase, poor biodegradability of encapsulating materials and the difficulty and high cost of manufacturing.

In U.S. Pat. No. 3,883,397, Townsky discloses a particulate material made of a nutrient formulation coated with a lipophilic material which suspends the material in the oil or near the oil-water interface. This coating is composed of magnesium, aluminum and calcium salts of lipophilic fatty acids, specifically magnesium stearate.

It would be desirable to have a composition that would retain essential microbial available nutrients, such as nitrogen, phosphorous and iron, within the oil phase of an oil and water mixture as occurs in an oil spill in an aquatic or wetland environment. It would also be desirable for the nutrient formulation to be able to sustain growth of microorganisms throughout the body of oil. Also it would be desirable for the nutrient formulation to be supplemented with oxygen releasing compounds to provide molecular oxygen within the oil matrix to enhance growth of aerobic microorganisms. It would further be desirable if the nutrients and oxygen releasing compounds were released and/or activated at a slow and controlled rate based upon biological demands of the microorganisms through degradation of the encapsulating coating and partial dissolution of the coating into the oil phase.

SUMMARY OF THE INVENTION

The present invention provides a particulate material for promoting growth of petroleum degrading bacteria. Each particle of the nutrient material comprises a core of water soluble microbial available nutrients selected from the group consisting of nitrogen in the form of ammonium or urea compounds, phosphorous in the form of microbial available phosphate compounds, iron in the form of microbial available iron compounds, and oxygen in the form of various hydrogen peroxide compounds. The coating formulation of this invention uses a mixture of saturated and unsaturated fatty acids to form a coating material which is readily biodegradable, has physical properties making it efficient for encapsulating microbial nutrients, increases the oil phase partitioning of the composite and reduces the cost of manufacture.

More particularly, the encapsulation for the core of nutrients is formed of an oleophilic and biodegradable coating comprising oleic acid and a carboxylic acid selected from the group consisting of stearic acid, palmitic acid, and mixtures thereof. The preferred ratio of oleic acid to the selected carboxylic acid is between about 70:30 and about 30:70 by weight.

The invention also provides a process of manufacturing the coated nutrient material, which comprises mixing microbial nutrients together as dry ingredients and grinding them into a powder sufficient to pass through a number 40 sieve. A coating mixture is prepared from commercial grade stearic acid and oleic acid at a preferred ratio of 40:60 by weight. The coating mixture is melted by heating to 100° C. and resolidified to form a homogeneous composite, remelted at 100° C. Upon cooling to 65° C., the coating is blended into the nutrients at a ratio of 90% nutrients to 10% coating by weight.

The invention further provides a method of using or applying coated nutrients to foster microbial growth for conversion of an oil slick. The material is applied to an oil spill as soon as possible to begin microbial development. The preferred dosage is a rate of 10 to 15 pounds per barrel of spilled oil. The material can be reapplied at time intervals ranging from 48 to 96 hours. The application can be achieved by any conventional means including, but not limited to, spraying, dusting, and dropping from an airplane.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a flow diagram of the method of manufacturing the present composite material.

DETAILED DESCRIPTION OF THE INVENTION

Figure 2:
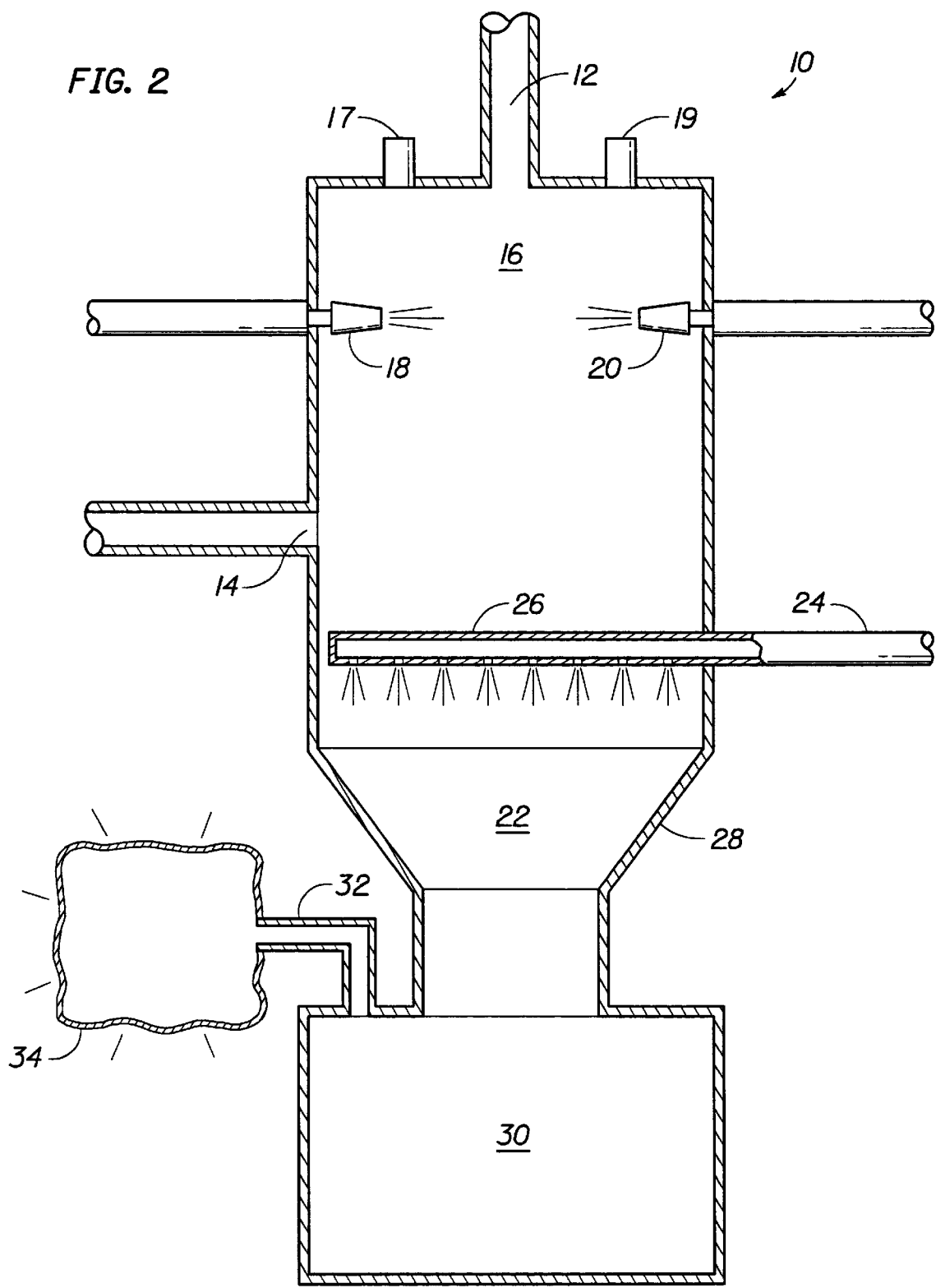
FIG. 2 is a sectional view through a reaction chamber where the composite material may be manufactured.

The present invention provides a particulate composition having a nutrient formulation, an oxygen releasing compound, and an oleophilic coating. The preferred nutrient formulations for fostering the growth of petroleum degrading bacteria have the following exemplary proportions:

between about 90 and about 94 percent (%) by weight ammonium sulfate [$(NH_4)_2SO_4$], urea or combinations thereof as a source of nitrogen;

between about 5 and about 8 percent (%) by weight potassium phosphate dibasic [$K_2HPO_4$] or substitutions such as potassium phosphate monobasic [$KH_2PO_4$] or calcium phosphate monobasic [$CaHPO_4$], dibasic [$Ca(H_2PO_4)_2$] or tribasic [$Ca_3(PO_4)_2$], urea phosphate, or ammonium phosphate [$NH_4H_2PO_4$]; and between about 1 and about 2 percent (%) by weight ferrous sulfate [$FeSO_4$] or a substitution such as ferrous sulfate heptahydrate [$FeSO_4*7H_2O$ ].

The most preferred nutrient formulations have an ammonium/urea:phosphate compound:iron compound ratio between about 90:8:2 and about 94:5:1. The precise formulation of nutrients can vary according to the specific type of microorganism present in the water, the composition of the spilled oil and the current costs of each nutrient source. The nutrient formulation is mixed together as dry ingredients and ground into a powder sufficient to pass a U.S. standard number 40 sieve.

It is preferred that the nutrient formulation be mixed with compounds that provide a source of molecular oxygen including, but not limited to, urea hydrogen peroxide. These compounds release molecular oxygen ($O_2$) by enzymatic or chemical reactions. This molecular oxygen is utilized by the microorganisms to enhance and promote aerobic metabolism throughout the oil rather than solely at the interface of the oil.

These oxygen releasing compounds may be incorporated into either the nutrient formulation or within and as part of the fatty acid coating matrix described below. It is preferred that the oxygen releasing compounds comprise between about 1 and about 20 percent (%) by weight of either the nutrient formulation, the oleophilic coating, or both together.

Because hydrogen peroxide is known to be unstable in aqueous solutions and is also toxic to microorganisms at high concentrations, the oxygen releasing compounds of hydrogen peroxide are incorporated as encapsulated particulates. Utilization of hydrogen peroxide and peroxide compounds to enhance microbial growth has been well documented, but has seen little practical application in the field because of the previously noted problems—stability and toxicity. The encapsulation of particulate peroxide compounds (as example being, but not limited to, urea hydrogen peroxide) stabilize the materials by keeping the compounds from rapidly reacting with water or divalent cations which promote peroxide degradation (for example $Fe^{+2}$). The encapsulation also prevents the toxicity of rapid peroxide decomposition from effecting the microorganisms through regulated release of compounds at concentrations that support microbial growth and limit promotion of toxic oxygen radicals.

In order to prevent rapid dilution of these water soluble nutrients upon application, a water insoluble coating is applied which is lipophilic and oleophilic. This coating is vital to the retention of the nutrient product in the oil phase where it is needed to support bacterial growth. It is also important that the coating release the nutrients and oxygen gradually over the period between applications.

The rate at which the product components are released is determined by partial dissolution of the coating in the oil phase and biological degradation of the coating caused by the microorganisms. As hydrocarbon degrading microbes utilize the available petroleum hydrocarbons, they concomitantly metabolize the component fatty acids constituting the coating mixture which encapsulate the essential nutrient formulation. As the coating becomes perforated, the inner core of water soluble nutrients and oxygen releasing components are dissolved into the oil. In this fashion, the encapsulated nutrients are made available over time upon biologically mediated demand. Supplemental applications of the nutrient composite can be made to ensure sufficient nutrient concentrations are available to foster and sustain enhanced microbial growth.

The coating formulation of this invention uses a mixture of saturated and unsaturated fatty acids to form a coating material which is readily biodegradable, has physical properties making it efficient for encapsulating microbial nutrients, increases the oil phase partitioning of the composite and reduces the cost of manufacture. More particularly, the encapsulation for the core of nutrients is formed of an oleophilic and biodegradable coating comprising oleic acid and a carboxylic acid selected from the group consisting of stearic acid, palmitic acid, and mixtures thereof. The preferred ratio of oleic acid (unsaturated) to the selected carboxylic acid (saturated) is between about 70:30 and about 30:70 by weight.

The coating of the present invention may be prepared with any ratio of saturated fatty acids and unsaturated fatty acids where the coating is sufficiently biodegradable to release nutrients as needed and has a sufficiently high melting temperature to allow the coated nutrient to be stored without clumping together. The preferred coating formulation comprises the following:

between about 30 and about 70 percent (%) by weight saturated fatty acids, such as stearic acid [$CH_3(CH_2)_{16}COOH$] including commercial preparations such as EMERSOL 132, PROMULSIN and PROVISCOL WAX, or palmitic acid [$CH_3(CH_2)_{14}COOH$], or mixtures thereof; and between about 30 and about 70 percent (%) by weight oleic acid [$CH_3(CH_2)_7CH\!=\!CH(CH_2)_7COOH$].

It is most preferred that the coating include between about 2% and about 5% of stearamide [$CH_3(CH_2)_{16}CONH_2$], palmitamide [$CH_3(CH_2)_{14}CONH_2$] or oleamide [$CH_3(CH_2)_7CH\!:\!CH(CH_2)_7CONH_2$] to extend the period of time over which the nutrients are released and to additionally enhance the nutrient availability of the coating mix itself, such that the ratio of saturated:unsaturated:amine-substituted fatty acid is in the range of about 30:68:2 to about 65:30:5 by weight.

To prepare the coating formulation, the fatty acids are mixed together, heated to melting at 100° C., then cooled to produce a homogenous solid composite mixture. Before being applied to the nutrients, the coating mixture is remelted at 100° C. to achieve a smooth flowing liquid. Then the coating is cooled to about 65° so that it will solidify quickly when applied to the nutrients.

Using the coating formulation just described, an encapsulated particulate composite can be manufactured in at least two ways. Using a conventional manufacturing method, the coating material is added as a liquid into the dry solids mixer while the nutrients are being blended. An appropriate dry solids mixer for this method is a Ross ribbon blender made by Ross Manufacturing. It may become necessary to equip the ribbon blender with a chopper attachment to reduce clumps that form in the mixing process. The coating formula is added to the nutrients at a ratio between about 8 and about 20 percent (%) by weight to ensure adequate encapsulation, while the preferred ratio is about 10% by weight. The coated nutrient mixture must be removed from the mixer and screened to remove clumped material, preferably by passing the coated nutrient through a U.S. standard number 20 sieve. The sifted material is then remixed with between about 1 and about 1.5 percent (%) amorphous silica or any other standard anti-caking agent to maintain the free flowing properties of the invention.

Now referring to FIG. 1, a second method of manufacturing the composite is detailed. Mixed and powdered nutrients are sprayed as an aerosol into a vessel. The encapsulation coating is also aerosolized and sprayed as a micro-droplet sized mist into the vessel where is contacts the powdered nutrients and solidifies thereon. An apparatus for carrying out this method of manufacture is illustrated in FIG. 2. The advantages of this novel method of manufacture include reduced clump formation and a reduction in the time and cost of screening the composite through a sieve. Furthermore, the equipment can be designed as a continuous flow machine, with raw ingredients entering at one end of the machine and essentially finished product exiting at the other. An anti-caking agent, such as amorphous silica, may be added to the coated product to maintain product flow properties.

A description of how the coating apparatus functions is given hereafter. The reaction chamber 10 is a vertical vessel in which the composite material is made. Gas flow nozzles 12 and 14 provide a steady flow of warm air to the mixing zone 16. The warm air helps regulate the temperature of the mixing zone 16 to achieve proper coating of the nutrients and also determined the retention time of the powdered nutrients in the mixing zone. Powdered nutrients are sprayed through nozzle 18 into mixing zone 16 as a suspended aerosol. The nutrient aerosol is then contacted with hot liquified encapsulation coating sprayed through nozzle 20 into the mixing zone 16 to form a fully or partially encapsulated composite.

The composite material can be manufactured either as a powder, pellet or particulate. To manufacture a powdered composite, a gas or air flow is directed downward from nozzle 12 such that the nutrients remain in the mixing zone 16 for only a short period of time. In order to manufacture a pelletized composite material, the gas or air flow is directed upward from nozzle 14 to mixing zone 16 and out through air pressure relief valves 17 and 19 at the top of reaction chamber 10. This upward flow of gas provides an uplifting force or air cushion which maintains the nutrients in the mixing zone 16 until sufficiently coated to agglomerate and increase in weight. Once the pellet reaches a given weight, gravitational forces will become greater than the upward gas lift and the pellet will begin to fall.

As the composite material falls out of the chamber 10, it passes through a cooling zone 22. The zone 22 is cooled by forcing chilled gas or air through nozzle 24 and downward through distributor 26. When the composite material comes into contact with the chilled gas, the coating is solidified.

The finished composite then passes through a conical restriction 28 to a collection mechanism 30, typically a dust collector, where the composite is collected and ready for use. Air pressure is relieved through connector pipe 32 to bag filter 34.

In an alternative method of manufacturing the composite, the encapsulation coating may be brought into contact with the nutrient aerosol by dissolving the encapsulation formulation in a rapidly evaporating solvent. In this manner, the dissolved coating mixture precipitates onto the surface of the base powder.

The composite product can be applied to a oil spill using conventional powder spraying equipment with no pre-mixing or dilution required. Application of the product may also be achieved by hand broadcasting, dust blowing or by aircraft. Soft clumps may form after prolonged storage, but they are easily broken by mechanical mixing.

Initial applications to open water spills should be 5–15 pounds of product per barrel of spilled oil (approximately 14–43 kilograms per cubic meter of spilled oil), but should not exceed 250 pounds per acre (280 kilograms per hectare) of surface area per application. The product should be applied to spilled oil as soon as possible following spillage to stimulate natural oil utilizing microbial populations to maximize biodegradation activity. Follow-up applications may be made at 48–96 hour intervals until the oil is completely consumed. The exact interval and the weight of product per acre is based upon factors such as the degree of reduction in oil by clean-up activities and natural loss by evaporation, droplet formation, dispersion, composition of the oil, type of bacteria present and microbial activity. Application of this novel product to spilled oil does not significantly alter the physical consistency of the spilled oil, and will not adversely impact conventional clean-up activities, nor will conventional containment and removal activities adversely harm the activity of the coated nutrient product.

Application of the product to wetland spills should be limited to the area of oil contamination. The best possible estimate of quantity of oil concentration is used to calculate the quantity of product to be applied in this instance. Recommended application is 10–25 pound of product per barrel of oil spilled (approximately 28–71 kilograms per cubic meter of oil spilled), but should not exceed 250 pounds per acre (280 kilograms per hectare). The product should be directly applied to the oil contaminated habitat by use of dust delivery equipment. The product should be applied directly to any visible oil and all visible oil should be lightly coated. In general, successive light treatments is preferred over a single heavy application. Follow-up application should be made at weekly or bi-weekly intervals. The product is most effective where oil has not formed a hard exterior crust that prevents the nutrient product from integrating into the oil layer itself.

Application of the product to beach spills should be made directly onto the oil at 15–30 pounds per barrel of spilled oil (approximately 43–86 kilograms per cubic meter of oil spilled). Where the spilled oil is mixed with sand or beach cobbles, the product should be directly sprayed onto contaminated areas and mixed into the beach material if possible. In this situation, an application may be increased to 300 pounds per acre (approximately 336 kilograms per hectare).

It is important that the nutrient materials have low toxicity since they are often applied in areas that contain fish and other wildlife. In order to avoid most toxicity problems, the amount of nutrient material applied is never to exceed 300 pounds per acre (approximately 336 kilograms per hectare).

To confirm the effectiveness and the non-toxic nature of the material, the following laboratory tests were carried out.

EXAMPLE 1

Biodegradation potential was assessed by treatment of artificially weathered crude oil treated with a oleophilic nutrient mixture without an oxygen releasing compound. An identical untreated control was maintained for comparison.

The analysis was conducted in a dual chambered continuous flowing reaction chamber using filtered natural seawater from Galveston bay (collected at Texas A&M University, Pelican Island Marine Station.) Seawater was continuously exchanged during the experiment at 40 milliliters per minute with no recycling. The seawater was maintained at 33 ppt salinity and 29° C. to approximate summer conditions in Galveston Bay. 25 milliliters of oil was added to the chamber to obtain a surface oil thickness of 1.225 millimeters, which is equivalent to 30.6 barrels of oil per acre (approximately 12 cubic meters of oil per hectare), assuming uniform spreading of oil. The oil was prepared from Alaskan Prudhoe Bay crude, sparged with air for 4 hours prior to application to water, and allowed to spread on the water for 12 hours prior to treatment.

The oil was then treated with 0.30 grams of a nutrient mixture composed of 0.256 grams of $(NH_4)_2SO_4$, 0.011 grams of $KH_2PO_4$, and 0.003 grams of $FeSO_4 \cdot 7H_2O$, coated with a mixture of 0.018 grams oleic acid and 0.012 grams stearic acid. The reaction vessel was continuously aerated with bubblers at a rate of 250 milliliters of air per minute.

After 48 hours, a follow-up application was made using only one-half the amount of nutrient mixture as in the original application.

The quantity of surface oil present is measured by adherence of the surface oil to glass fiber disks (0.633 cm$^2$ per disk, total 5 disks per sample). Adherent oil is then extracted from the disks with GC grade methylene chloride (Burdick and Jackson, obtained from Baster Scientific, Inc.) The samples were analyzed by M.B.A. Labs, Houston Tex. using gas chromatography with flame ionization detection. Analysis was limited to hydrocarbons of weight $C_{15}$ or greater and gravimetric quantitation for total petroleum hydrocarbons.

TABLE I: This table contains the results of a comparison of total hydrocarbons from surface oil (mg/cm$^2$ of film area) between a control and a sample with the nutrient mixture added.

| TIME (HOURS) | CONTROL | NUTRIENT MIXTURE |
| --- | --- | --- |
| 0 | 20.6 | 18.4 |
| 26 | 13.6 | 6.5 (53.5%) |
| 32 | 14.8 | 6.0 (45.4%) |
| 48 | 10.5 | 2.8 (29.9%) |
| 72 | 4.1 | 1.6 (43.7%) |
| 240 | 5.1 | 2.3 (50.5%) |

The figures in parenthesis represent the percent difference in reduction of oil between the treated and untreated oil as measure after each time period.

EXAMPLE 2

A nutrient mixture and coating were prepared as described in example 1. The toxicity of the product as expressed by reduced survival of organisms exposed to various dilutions of the product was determined through a 48 hour acute static renewal bioassay using *Mysidopsis bahia* and *Cyprinodon variegatus*. E.P.A./600/4-85/013 test protocol was followed. All organisms were maintained at room temperature with a light/dark cycle of 16/8. Dilution water was made from Tropic Marine Synthetic Sea Salt and was aerated for 24 hours before use in the test. The test was performed in 600 ml polypropylene diSPo beakers rinsed in the dilution water. Ten organisms of *Mysidopsis bahia* were placed in 200 ml of dilution water making a 5 cm depth. Ten organisms of *Cyprinodon variegatus* were placed in 500 ml of dilution water making a 9.5 cm depth.

Dissolved oxygen, pH, conductivity and salinity, alkalinity and hardness were measured before water renewal. CdCl supplied by the E.P.A. was used as the reference toxicant for both of the Mysidopsis and Cyprinodon organisms. Both the Mysidopsis and the Cyprinodons used in this test were obtained from Aquatox, Inc., and were approximately 27 days old at the time of testing. Both batches of organisms were acclimated to the proper salinity, by adding 300 ml of synthetic, fresh water, every hour until test initiation. The salinity was 11 parts per thousand for both batches of organisms before use in the test. Holding water and sample temperatures were 24° C. at test initiation. The test ran 23 hours before starting water renewal. The test finished 1 hour later.

The E.P.A. Probit Analysis Program for Calculating Values, Version 1.4 provided the following results:

*Mysidopsis bahia* EC$_{50}$ = 0.12 g/l    (>300 pounds/acre)
CdCl EC$_{50}$ = 118.5 ug/l
*Cyprinodon variegatus* EC$_{50}$ = 0.50 g/l    (>1300 pounds/acre)
CdCl EC$_{50}$ = 7823.7 ug/l The test illustrates that the coated nutrient mixture is only slightly toxic and can be used safely in quantities up to 300 pounds/acre.

It will be understood that certain combinations and sub-combinations of the invention are of utility and may be employed without reference to other features in subcombinations. This is contemplated by and is within the scope of the present invention. As many possible embodiments may be made of this invention without departing from the spirit and scope thereof, it is to be understood that all matters hereinabove set forth are to be interpreted as illustrative and not in a limiting sense.

While the foregoing is directed to the preferred embodiment, the scope thereof is determined by the claims which follow:

What is claimed is:

1. A coating formulation for a bioremediation nutrient, comprising:
    a saturated fatty acid selected from stearic acid, palmitic acid or mixtures thereof; and
    an unsaturated fatty acid selected from oleic acid, linoleic acid or mixtures thereof;
    wherein the ratio of the saturated fatty acid to the unsaturated fatty acid is between 70:30 and 30:70 by weight.

2. The coating formulation of claim 1 wherein the saturated fatty acid is stearic acid, and wherein the unsaturated fatty acid is oleic acid, and wherein the ratio of the saturated fatty acid to the unsaturated fatty acid is about 40:60 by weight.

3. The coating formulation of claim 1 further comprising an amine substituted form of a fatty acid, wherein the fatty acid is selected from the group consisting of stearic acid, palmitic acid and oleic acid, and wherein the ratio of saturated:unsaturated:amine-substituted fatty acids is in the range of about 30:68:2 to about 65:30:5 by weight.

* * * * *